Aug. 2, 1932.  C. L. EKSERGIAN ET AL  1,869,960
ARTILLERY STEEL WHEEL
Filed March 5, 1931
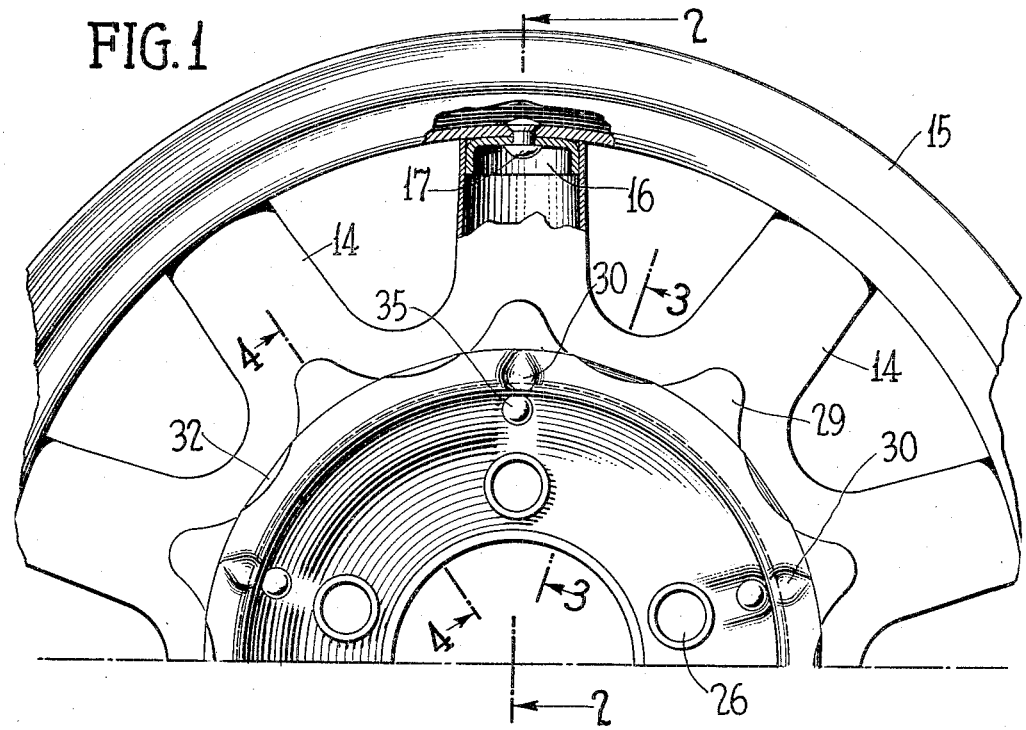
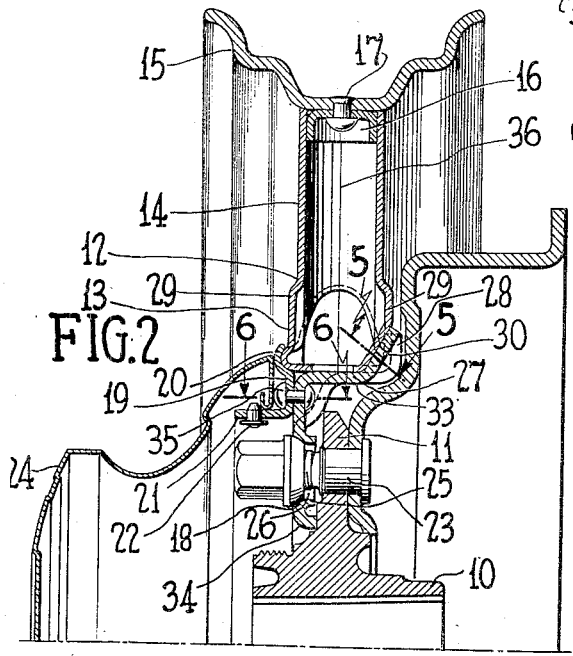
INVENTOR.
CAROLUS L. EKSERGIAN
BY PAUL W. GAENSSLE
ATTORNEY.

Patented Aug. 2, 1932

1,869,960

UNITED STATES PATENT OFFICE

CAROLUS L. EKSERGIAN AND PAUL W. GAENSSLE, OF DETROIT, MICHIGAN, ASSIGNORS TO BUDD WHEEL COMPANY, OF PHILADELPHIA, PENNSYLVANIA, A CORPORATION OF PENNSYLVANIA

ARTILLERY STEEL WHEEL

Application filed March 5, 1931. Serial No. 520,196.

Our invention relates to the art of artillery wheels and it has been our particular object to provide an artillery wheel of the hollow steel type having an unusually strong nave portion. A further object has been to provide a hollow wheel having integral hollow spoke and rudimentary nave portions connected to the permanent hub of the vehicle by means of clamps abutting opposite sides of the wheel and secured together in such a manner as to be interlocked with the rudimentary nave portion of the wheel whereby the connections between these members are capable of resisting stresses imposed from every direction. A further object of our invention has been to provide a wheel of this type mounted in such a manner as to be interchangeable with an ordinary wire wheel without changing the plane of tread of the vehicle. Further objects pertain to an improved method of fabricating a wheel of this type to facilitate the operation of securing the wheel body to the rim.

Still further objects and advantages of our invention will be obvious from a reading of the sub-joined specification in the light of the attached drawing, in which;

Fig. 1 is a rear side elevation of our improved wheel removed from the vehicle hub.

Fig. 2 is a section on the line 2—2 of Fig. 1.

Figs. 3 and 4 are sections on the lines 3—3 and 4—4 respectively of Fig. 1, and

Figs. 5 and 6 are sections on the lines 5—5 and 6—6 respectively of Fig. 2.

Referring to the drawing by reference characters, the numeral 10 indicates the hub of the vehicle which is provided with a radially extending flange 11 intermediate its ends and our improved wheel is adapted to be secured in abutting relationship to this radially extending flange. The main body of the wheel consists of a hollow sheet metal portion 12 comprising an abbreviated hollow nave portion 13 and hollow spokes 14 integrally interconnected. While this portion of our wheel may be formed in any suitable manner, we prefer to form the opposite sides of the wheel in opposed stampings and weld them together as indicated at 36 to form in effect a single sheet metal body. The spokes are secured to a rim 15 by means of suitable plugs 16 which are riveted to the rim and telescoped within the ends of the spokes.

As stated above, the nave portion of the wheel is abbreviated and this portion is interconnected to the permanent hub of the vehicle by means of a suitable clamp 18 which is formed in two opposed stampings 19 and 25 abutting opposite faces of the nave of the wheel and secured rigidly together to permanently clamp the abbreviated nave portion. The outer clamp stamping comprising a radially extending portion 20 is curled over an annular rib formed at the inner radial extremity of the wheel body. This stamping is turned axially outwardly adjacent its inner circumference to provide an annular flange 21. Spring pressed locking pin 22 passes through an opening in this flange and serves to lock a bolt concealing ornamental hub cap 24 in place.

The inner stamping 25 is provided with a plurality of bolt receiving openings 26 in an annularly arranged series and suitable bolts 23 pass through these openings to secure the wheel in place. The inner stamping 25 is provided adjacent the outer radial extremity of this main body with an axially inwardly extending portion 27 against which the base of the abbreviated nave of the main body of the wheel seats. The inwardly extending portion 27 terminates in a radially outwardly extending portion 28 which clamps the inner face of the wheel in place. The main body of the wheel is provided with a plurality of ribs 29 extending radially outwardly in the neighborhood of its several spokes and the radially extending portion 28 of the inner clamp stamping is provided with portions 32 crimped over the inner portions of these ribs.

The wheel body and the inner stamping are provided with complementally depressed portions 30 to provide a driving interlock between the main body of the wheel and the stamping 25. A plurality of radial ribs are provided at 33 and these ribs are adapted to abut the outer radial extremity of the hub flange 11 to provide a seat for the wheel at this point. The stamping 25 is also provided with an axially inturned extremity radially inwardly of the bolt circle, as shown at 34. The portions of the opposed clamp stampings intermediate the ribs 33 abut radially and are riveted together at 35 to clamp the wheel body firmly between these opposed stampings.

In the manufacture of our improved wheel we prefer to provide openings in the nave portion as indicated at 37 in alignment with the respective spokes. By reason of providing these openings we are enabled to insert a suitable anvil or other tool into the interior of each of the spokes in order to secure the rivet 17 in place. This step is of course performed before the securement of the clamps 19 and 25 to the wheel body.

It will be readily understood that we have effected a solution of a difficult problem in this manner for the problem of effecting a secure interlock between the spokes and rims of artillery wheels is rendered very difficult by reason of the fact that it is impossible to effect any manipulation of the wheel whatever from the interior of the spoke when the nave portion is closed. The manner in which we have attained the objects of our invention will now be apparent. The main body of the wheel is slightly offset with respect to the hub flange to provide mounting conditions identical with those encountered in the mounting of wire wheels on the same hub flange. The depressed portions 30 and the curled-over edges 20 and 32 of the clamp stampings afford both a radial and a driving interlock between the clamps and the wheel bodies. As above explained, the fabrication of the wheel is very much simplified by reason of the facility of manipulation from the interior of the spokes.

Modifications will be obvious to those skilled in the art and we do not therefore wish to be limited except by the scope of our sub-joined claims as interpreted in the light of the generic spirit of our invention.

What we claim is:

1. A vehicle wheel comprising, in combination, integral hollow spoke and foreshortened nave portions, and a reinforcing clamp comprising opposed members engaging opposite sides of the wheel nave to clamp the same, said members extending radially inwardly in abutting relationship beyond the hollow nave portion and being secured together in said zone of radial abutment.

2. A vehicle wheel comprising, in combination, integral hollow spoke and foreshortened nave portions, and a reinforcing clamp comprising opposed members engaging opposite sides of the wheel nave to clamp the same, said members extending radially inwardly in abutting relationship beyond the hollow nave portion and being riveted together in said zone of radial abutment.

3. A vehicle wheel comprising, in combination, integral hollow spoke and foreshortened nave portions, a reinforcing clamp comprising opposed members engaging opposite sides of the wheel nave to clamp the same, said members extending radially inwardly in abutting relationship beyond the hollow nave portion and being secured together in said zone of radial abutment, the outer clamp member having an axially projecting portion, and a hub cap secured to said axially projecting portion.

4. A vehicle wheel comprising, in combination, integral hollow spoke and foreshortened nave portions, and a reinforcing clamp comprising opposed members engaging opposite sides of the wheel nave to clamp the same, said members extending radially inwardly in abutting relationship beyond the hollow nave portion and being secured together in said zone of radial abutment, said clamp being mechanically interlocked with said nave portion both radially and circumferentially.

5. A vehicle wheel comprising, in combination, integral hollow spoke and foreshortened nave portions, and a reinforcing clamp comprising opposed members engaging opposite sides of the wheel nave to clamp the same, said members extending radially inwardly in abutting relationship beyond the hollow nave portion and being secured together in said zone of radial abutment, said clamp being mechanically interlocked with said nave portion both radially and circumferentially, said nave portion being further seated upon an axially projecting portion upon one of said members.

In testimony whereof we hereunto affix our signatures.

CAROLUS L. EKSERGIAN.
PAUL W. GAENSSLE.